Dec. 23, 1947.  T. P. VAN SCIEVER  2,433,249

NAVIGATIONAL COMPUTER

Filed Feb. 1, 1946

INVENTOR.
THOMAS P. VAN SCIEVER
BY
ATTORNEY

Patented Dec. 23, 1947

2,433,249

UNITED STATES PATENT OFFICE 2,433,249

NAVIGATIONAL COMPUTER

Thomas P. Van Sciever, Denver, Colo.

Application February 1, 1946, Serial No. 644,714

11 Claims. (Cl. 235—61)

This invention relates to calculating and computing devices designed for the prompt and facile solution of navigational problems, particularly those pertinent to the direction and control of aerial flight, and has as an object to provide a conveniently-portable, operatively-expeditious, functionally-accurate unit employable in flight as well as in the advance preparation of flight plans for the resolution of the practically-calculable problems and situations incident to flight navigation.

A further object of the invention is to provide an improved navigational computer comprising in a single, compact unit all of the facilities essential to resolution of the navigational problems incident to practical flight as practiced with reference to conventional aids.

A further object of the invention is to provide an improved construction and selectively-adjustable interrelation of elements constituting a navigational computer.

A further object of the invention is to provide an improved unitary operative grouping of elements essential for the solution of various specific navigational problems throughout a comprehensive range of situations practically to be anticipated.

A further object of the invention is to provide an improved arrangement and association of relatively-movable elements positionable to manifest observed and detected data for the immediate translation of such data into determinants of flight direction and control problems.

A further object of the invention is to provide an improved navigational computer that is simple and inexpensive of construction, positive and efficient in attainment of the ends for which designed, durable in use, comprehensive in operative scope, and susceptible of ready manipulation by a user simultaneously directing an aircraft in flight.

With the foregoing and other objects in view, my invention consists in the construction, arrangement, and combination of elements hereinafter set forth, pointed out in my claims, and illustrated by the accompanying drawing, in which—

Figure 1:
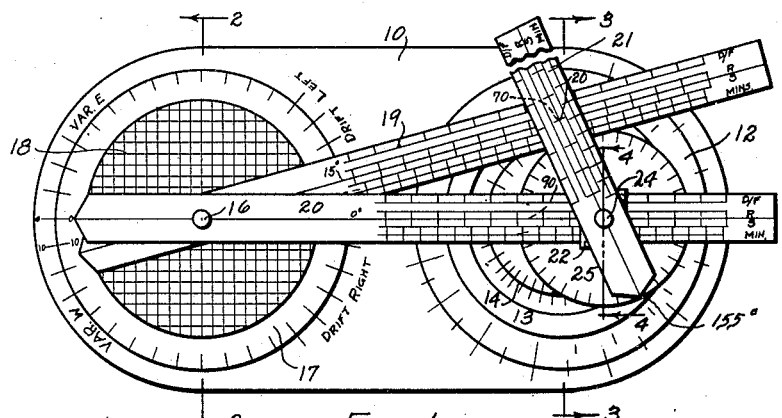
Figures 2, 3:
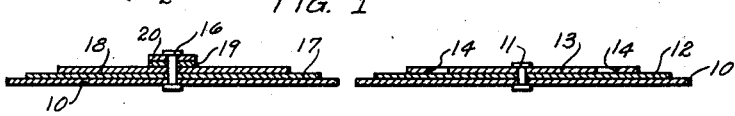
Figures 4, 5:
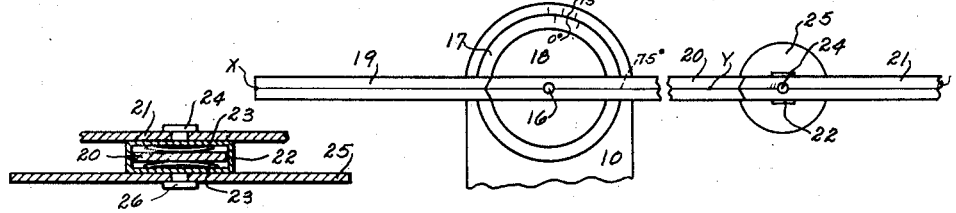
Figures 6, 7:
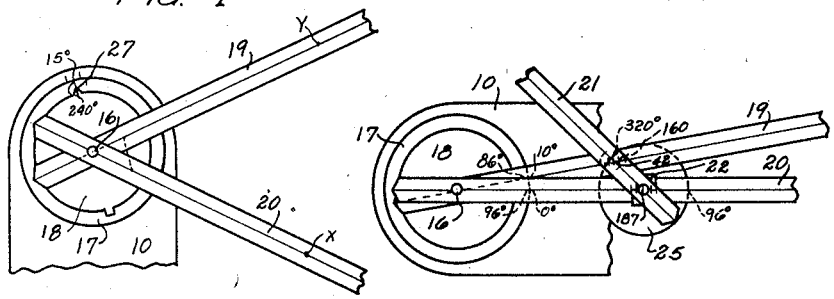
Figure 8:
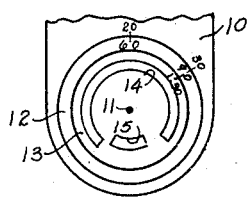
Figure 9:
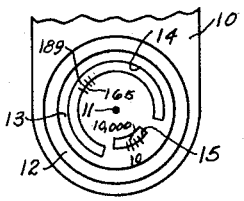

Figure 1 is a top plan view of an essentially simple embodiment of the invention as completely assembled and as arranged for the solution of a typical navigational problem. Figure 2 is a cross section taken substantially on the indicated line 2—2 of Figure 1. Figure 3 is a cross section taken substantially on the indicated line 3—3 of Figure 1 with certain superposable elements of the assembly omitted. Figure 4 is a fragmentary, detail section, on an enlarged scale, taken substantially on the indicated line 4—4 of Figure 1. Figure 5 is a diagrammatic view of a portion of the assembly shown in Figure 1 as arranged for the solution of a particular navigational problem. Figure 6 is a view similar to Figure 5 illustrating the relatively-movable elements of said latter figure as arranged for the solution of a different navigational problem. Figure 7 is a view similar to Figure 5 showing the relatively-movable elements of the assembly as arranged for the solution of still another navigational problem. Figure 8 is a diagrammatic view of the end of the assembly opposite to that shown in Figures 5, 6 and 7 representing the relatively-movable elements of said assembly portion as arranged for the determination of factors pertinent to flight navigation. Figure 9 is a view similar to Figure 8 illustrating the relatively-movable elements of the assembly portion as arranged for the determination of yet other flight pertinent factors.

In the preliminary plotting and actual performance of aerial flights over established airways served by conventional navigational aids, or over non-airway paths between selected spaced points, a plurality of problems requiring solution is presented. All of the navigational problems are susceptible of mathematical resolution, given adequate time and proper facilities, but the delay and inconvenience attendant upon location and selection of the essential facility, evaluation and adaptation of observed and determined data, and analogous complications of mathematical computations, seriously depreciate the practicability of such methods and point the need for simpler, faster, and more practical means of determining the pertinent and desired solutions, and it is to the provision of such means that the instant invention is directed.

In the embodiment of the improvement illustrated by the drawing, the various elements of the device are carried by and cooperatively grouped on a base member 10, of substantially elliptical outline, formed from any suitable sheet material having the requisite properties of strength, rigidity, and durability, in any convenient size adequate to provide the desired degree of accuracy in use. While not functionally essential, transparency of the member 10 is a convenience in certain uses of the device and is to be preferred, hence it is contemplated that said member, as well as other elements of the assembly, may be desirably fabricated from transparent plastic materials, synthetic resins, and the like.

Adjacent and concentric with one end of the base member 10, a stud 11 is suitably fixed to upstand perpendicularly above the base member face surface for the reception and pivotal mounting in superposed relation of a pair of discs 12 and 13, which discs are independently rotatable on and about the center provided by the stud 11, are retained against separation from the member 10 and from each other, and are of such relative diameters as will space the periphery of the larger disc 12 inwardly from the base member 10 end margin to leave an annular face portion of said member exposed circumferentially about said disc, and space the periphery of the lesser disc 13 inwardly from the margin of the disc 12 to leave an annular face portion of the latter exposed circumferentially about the disc 13. The disc 13 is formed with concentric, incomplete, annular slots 14 and 15 intersecting its area to expose portions of the otherwise concealed disc 12 area, and the slot-exposable disc 12 areas, margins of the slots 14 and 15, periphery of the disc 12 and exposed annular areas of the base member 10 and disc 12, are calibrated and graduated in the form of circular scales, hereinafter more particularly described, wherefrom data and relations pertinent to flight situations and problems may be read subsequent to proper manipulation and setting of the rotatable disc elements. As a convenience in the reading of indications carried by the discs 12 and 13 and adjacent base member area, it may be desirable that such portions of the device be opaque.

Adjacent and concentric with the other end of the base member 10, a stud 16, similar to but longer than the stud 11, is suitably fixed to upstand perpendicularly above the base member face surface in parallel relation with said stud 11, and greater and lesser discs, 17 and 18 respectively, are centered in superposed relation on and for independent rotation about the stud 16 in a manner to expose an annular portion of the base member face surface circumferentially about the disc 17 and an annular portion of the disc 17 circumferentially about the disc 18. Diametrically overlying the exposed face of the disc 18, superposed similar, straight arms, 19 and 20, of any suitable equal or different lengths, engage with and are held for independent rotation on and about the stud 16 in such relationship therewith as locate the axis of said stud in intersecting relation with the longitudinal center line of each said arm, and the shorter ends of said arms extend just beyond the periphery of the disc 18 and are formed as indicators adapted to conveniently register the arm longitudinal center lines with compass graduations carried marginally of the disc 17, and thereby denote the angular disposition and relationship of said arms. Slidably and pivotally associated with the arm 20, a similar, but relatively shorter arm 21 is disposed for selective adjustment along said arm 20 and into various angular relationships with the two arms 19 and 20. The specific mounting of the arm 21 on the arm 20 may take any form or construction suitable for maintenance of a pivotal axis common to and in intersecting relation with the longitudinal center lines of said arms, which axis is shiftable longitudinally along the center line of the arm 20, and a conventional type of such mounting is illustrated in Figure 4 as comprising a rigid, closed loop 22 slidably embracing the arm 20, resiliently-yieldable friction elements 23 engaging between sides of said loop and adjacent surfaces of the arm to hold said loop in position on and against unintentional displacement along the arm, and a headed stud 24 fixedly rising exteriorly, perpendicularly, and centrally from a loop side and through a hole formed for its accommodation in the arm 21. With the arrangement shown and described, the axis of the stud 24 is at all times aligned with the center lines of the arms 20 and 21, the arm 21 is swingable throughout a full circle about said stud, and the loop 22, carrying the stud 24 and arm 21, is slidably adjustable along and to any desired position on the arm 20. To manifest the angular relation at any time obtaining between the arms 20 and 21, a transparent disc 25, of suitable size, is marginally calibrated in terms of arc and is mounted beneath the arm 20 for rotation concentrically with and about the axis common to the arms 20 and 21, it being feasible and convenient when the slide loop 22 is employed to provide a stud 26 fixedly projecting in axial alignment with the stud 24 exteriorly from the loop side opposite to that mounting said latter stud and to secure the disc 25 in centered, rotatable relation thereon. For conveniently readable cooperation with the calibrations of the disc 25, the shorter end of the arm 21 is extended beyond the stud 24 and formed as an indicator overhanging the disc 25 margin to conveniently register the arm 21 center line against said disc margin calibrations.

The arms 19, 20 and 21 are alike in that they are of transparent material, in that each has its longitudinal center line clearly scribed or marked throughout its length, and in that each is correspondingly calibrated with identical scales which read in each instance from zero points at or corresponding to the pivotal axis of the arm. To extend the practical utility of the device, a plurality of specifically different scales is carried by each of the arms 19, 20 and 21, which scales, as will be obvious, may be graduated to read in any desired relationship or proportion against selected charts and maps in terms of time and distance. However, as a strictly practical consideration, it appears that but three differently-scaled chart and map publications are in general use for flight purposes and that scales related to said three publications suffice for nearly all practical applications of the device, hence the device is illustrated as provided with three mileage scales graduated in accordance with and adapted to be applied for measurement directly and respectively to Standard Coastal and Geodetic Survey D/F charts, regional maps, and sectional maps, which scales are designated D/F, R, and S for convenient identification and arranged with the D/F scale along a corresponding outer margin of each arm and the R and S scales correspondingly along and on opposite sides of the arm center lines. The remaining principal scale carried by the arms 19, 20 and 21 is uniformly graduated in terms of time, preferably minutes, is identified by the notation Min, and is scribed or otherwise imposed on and along each arm outer margin remote from the D/F scale. Supplemental, sub-divisional scales may, of course, be associated in paralleling adjacency with any of the principal arm scales, as is common practice.

To adapt the assembly constructed and arranged as above described for the solution of flight problems, the character and arrangement of scales carried by the base member 10, discs 12 and 13, slots 14 and 15, and discs 17 and 18 are important. The elements pivoted in common on and for adjustment about the stud 16 cooperate with the adjacent portion of the base member 10 and with each other for determinations of compass direction, true bearing, angular relationships, and distance, for which functioning the disc 17 is marginally calibrated as a compass rose in terms of arc, the base member 10 portion adjacent the disc 17 margin is also graduated in terms of arc reading in each instance and in both directions from diametrically-opposite zero points located on the base member greater axis through the center of the stud 16, and the disc 18 is surface-scribed or marked as a rectangular mileage grid whereof the line spacing corresponds with one of the arm mileage scales, preferably the D/F scale, so that a marginal pointer 27 on said disc aligns with and marks one of the disc grid diameters. The graduations of arc on and adjacent the end of the base member 10 are used to denote and are designated as East and West compass variation, while the similar graduations on the other side of the disc 17 and more centrally of the said base member are used to denote and are designated as angular measures of drift. The scales carried by the stud 11 cooperate with the adjacent base member portion and with each other for the determination of flight operating data such as true air speed, flight time, flight time and fuel estimates, and the like, to which end the scales are of well-known logarithmic or exponential type arranged to function as a circular slide rule or computer. As illustrated, a circular logarithmic scale on the base member 10 peripherally about the disc 12 is graduated and marked in terms of correlated miles and gallons to cooperate with a like scale marginally of said disc 12 denoting minutes of time in association with an inwardly-adjacent scale reading time in terms of hours, while the face portion of the disc 12 exposable through the relatively longer arcuate slot 14 of the disc 13 carries a logarithmic scale denoting true air speed in terms of miles per hour readable against a like scale on the convex margin of said slot representing indicated air speed in terms of miles per hour, and the disc 12 face portion exposable through the relatively shorter arcuate slot 15 is calibrated in terms of feet of pressure altitude readable against graduations indicating air temperature in degrees carried by the slot 15 concave margin, the scales carried by the disc 13 adjacent the slot margins being so correlated with the scales on the disc 12 and with each other as to translate indicated air speed immediately into correct true air speed for the observed air temperature and pressure altitude factors utilized in registering the pertinent scales.

Application of the improved unitary assembly to the solution of typical, simplified, flight problems is graphically represented by Figures 1, 5, 6, 7, 8 and 9 of the drawing and hereinafter specifically explained.

*Example 1*

Given an aircraft in flight on a course 90 degrees magnetic, a radio bearing of 155 degrees on station X, and a second radio bearing 20 flight miles subsequent to the first of 170 degrees on station X.

To determine distance of aircraft from station X.

Solution: (Figure 1).

Set arms 19 and 20 to a divergence of 15 degrees (difference between 170 degree and 155 degree bearings).

Register center line of arm 20 with 90 degree (course) mark of disc 25 and bring arm 21 center line into registration with 155 degree mark of said disc as so set.

Slide loop 22 along arm 20 until 20-mile graduation of mileage scale on arm 21 registers with arm 19 center line.

Read distance, 70 miles, from corresponding mileage scale of arm 19 at point intersected by arm 21 center line.

*Example 2*

Given a projected flight from point X to point Y, a magnetic variation of 15 degrees East, and a Coastal and Geodetic Survey D/F chart.

To determine distance and course of flight.

Solution. (Figure 5).

Rotate arms 19, 20 and 21 into extended alignment and set zero point of disc 17 in registration with 15 degree mark of easterly variation scale on base member 10.

Apply extended arms to chart as rule connecting between points X and Y and read distance therebetween directly from D/F scales on arms.

With arms in place on chart as above, rotate disc 25 into parallelism of its 0–180 degree line with chart meridian and read true course of 90 degrees where arm center line intersects said disc.

With arms in place on chart as above, adjust base member 10 into parallelism of its long axis (aligned zero points) with chart meridian and read magnetic course of 75 degrees where arm center line crosses margin of disc 17.

*Example 3*

Given an aircraft in flight on a course 240 degrees magnetic in a region of 15 degree westerly variation, a radio bearing of 10 degrees on station X, a simultaneous radio bearing of 320 degrees on station Y, and a D/F chart showing stations X and Y.

To determine geographical position of aircraft.

Solution: (Figure 6).

Register course indication, 240 degrees, of disc 17 against westerly variation of 15 degrees on base member 10.

Rotate arm 19 to registration of its center line over 320 degree mark of disc 17, and rotate arm 20 to registration of its center line over 10 degree mark of said disc.

Place adjusted device on chart with center line of arm 19 intersecting point Y and center line of arm 20 intersecting point X.

Read geographical location of aircraft on chart directly under pivotal axis of arms 19 and 20.

A variation of the above example occurs when the two radio bearings are successive in point of time rather than simultaneous, a correction of aircraft location away from the arm pivotal axis being then necessary. Assuming all of the data as given above with the exception that the radio bearings were taken at a six minute interval while flight was maintained at 200 miles per hour, thus representing a twenty mile distance traveled between bearings, the solution would follow exactly the procedure above given, amplified by the following corrective factors;

Register indicator of mileage-grid disc 18 with the 240 degree course mark of disc 17.

Select the grid line parallel to the disc 18 on-course diameter having a 20-mile interval (distance traveled between bearings) intercepted between center lines of arms 19 and 20.

Note position of aircraft on chart under point where selected grid line interval intersects arm 19 center line.

Example 4

Given an aircraft in flight at a true air speed of 160 miles per hour on a true (corrected magnetic) course of 96 degrees in a wind coming from 320 degrees at 42 miles per hour.

To determine actual ground speed, drift angle, and true heading to maintain course.

Solution: (Figure 7).

Register disc 17 true course 96 degree mark with zero indication of drift scale on base member 10.

Register disc 25 true course 96 degree mark under center line of arm 20 on side of disc pivot remote from disc 17 and register center line of arm 21 over 320 degree wind direction mark of said disc so set.

Align center line of arm 20 over drift and variation scale zeros on base member 10.

Slide loop 22 carrying adjusted arm 21 and disc 25 along arm 20 and oscillate arm 19 about its pivot until mileage scale graduation 42, wind velocity, on arm 21 registers at center line of said arm with the center line indication of graduation 160, true air speed, on corresponding scale of arm 19.

Read actual ground speed of 187 miles per hour from scale on arm 20 corresponding with scales used on arms 19 and 21 at point where pivotal axis of disc 25 and arm 21 intersects arm 20 center line.

Read drift angle of 10 degrees left from drift scale on base member 10 directly below arm 19 center line.

Read true heading of 86 degrees from disc 17 directly below center line of arm 19.

Example 5

Given an aircraft in flight at a ground speed of 200 miles per hour.

To determine time required for traverse of a 300 mile distance.

Solution: (Figure 8).

Register 60 minute graduation of marginal time scale on disc 12 with 20 (200) mark of adjacent base member scale.

Read time required, 90 minutes or 1 hour 30 minutes, from disc 12 scales opposite 30 (300) mark of adjacent base member scale.

Example 6

Given an aircraft in flight at 10,000 feet of pressure altitude, in air temperature of 10 degrees, and at an indicated air speed of 165 miles per hour.

To determine true air speed.

Solution: (Figure 9).

Register 10,000 foot pressure altitude mark of scale on disc 12 exposed through slot 15 with 10 degree mark of scale on disc 13 marginally of said slot.

Read true air speed of 189 miles per hour from scale of disc 12 exposed through slot 14 against 165 mile mark of scale on disc 13 marginally of said slot.

The foregoing typical, simplified examples clearly demonstrate the comprehensive useful scope of the improved device and its applicability to prompt and facile solution of substantially all navigational flight problems practically to be anticipated with modern equipment operated with reference to conventional ground aids. The simple construction and unitary assembly of the device enhance its availability for and convenience in use as a substitute for hitherto conventional analogous facilities and methods and bring within reach of the individual small craft operator determinations of navigational security and efficiency heretofore denied him because of operational demands on his attention and the space limitations of all but multi-crew craft.

Since many changes, variations, and modifications in the specific form, construction, proportions, arrangement, and calibration of the elements shown and described may be had without departing from the spirit of my invention, I wish to be understood as being limited solely by the scope of the appended claims, rather than by any details of the illustrative showing and foregoing description.

I claim as my invention:

1. A device of the character described, comprising a base, a compass rose rotatably associated with said base, a pair of arms independently swingable about the compass rose pivotal axis, a third arm pivotally and slidably associated with one of the arms of said pair, and a second compass rose movable with and independently rotatable about the third arm pivotal axis.

2. A device of the character described, comprising a base, a compass rose rotatably associated with said base, scales on said base peripherally adjacent and for indicative registration with the calibrations of said compass rose, a pair of arms independently swingable about the compass rose pivotal axis, a third arm pivotally and slidably associated with one of the arms of said pair, and a second compass rose movable with and independently rotatable about the third arm pivotal axis.

3. A device of the character described, comprising a base, a compass rose rotatably associated with said base, a pair of arms independently swingable about the compass rose pivotal axis and immediately overlying said compass rose, shorter end portions on said arms arranged for indicative registration of the arm center lines with the compass rose calibrations, a third arm pivotally and slidably associated with the longer end portion of one of the arms of said pair, and a second compass rose movable with and independently rotatable about the third arm pivotal axis.

4. A device of the character described, comprising a base, a compass rose rotatably associated with said base, a pair of arms independently swingable about the compass rose pivotal axis parallel to said base and immediately overlying said compass rose, shorter end portions on said arms arranged for indicative registration of the arm center lines with the compass rose calibrations, a third arm pivotally and slidably associated with the longer end portion of one of the arms of said pair in parallel relation with said base, a second compass rose movable with and independently rotatable about the third arm pivotal axis, and a shorter end on said third arm arranged for indicative registration of said arm center line with the second compass rose calibrations.

5. A device of the character described, comprising a base, a compass rose rotatably associated with said base, scales on said base peripherally adjacent and for indicative registration with the calibrations of said compass rose, a pair of arms independently swingable about the compass rose pivotal axis parallel to said base and immediately overlying said compass rose, shorter end portions on said arms arranged for indicative registration of the arm center lines with the compass rose calibrations and said scales, a third arm pivotally and slidably associated with the longer end portion of one of the arms of said pair in parallel relation with said base, a second compass rose movable with and independently rotatable about the third arm pivotal axis, a shorter end on said third arm arranged for indicative registration of said arm center line with the second compass rose calibrations, and linear scales correspondingly arranged on said arms in registration of their initial points with the respective arm pivotal axis.

6. A device of the character described, comprising a base, a compass rose rotatably associated with said base, a grid disc concentric with and rotatable independently of said compass rose, a pair of arms independently swingable about the compass rose and grid disc pivotal axis, and a third arm pivotally and slidably associated with one of the arms of said pair remote from said compass rose.

7. A device of the character described, comprising a base, a compass rose rotatably associated with said base, a grid disc concentric with and rotatable independently of said compass rose, a pair of arms independently swingable about the compass rose and grid disc pivotal axis, a third arm pivotally and slidably associated with one of the arms of said pair remote from said compass rose, a second compass rose movable with and independently rotatable about the third arm pivotal axis, and means for indicatively registering the center lines of said arms with the calibrations of the associated grid disc and compass roses.

8. In a device of the character described having a base, a compass rose rotatably associated with said base, and scales on said base peripherally adjacent and for indicative registration with the calibrations of said compass rose, a pair of arms independently swingable about the compass rose pivotal axis, means for indicatively registering the center lines of said arms with said scales and the compass rose calibrations, a third arm slidably associated with one of the arms of said pair parallel to said base, an axis pivotally intersecting the center lines of said third arm and its mounting arm, a second compass rose slidable with and independently rotatable about said third arm pivotal axis, and means for registering the third arm center line indicatively with the second compass rose calibrations.

9. In a device of the character described having a base, a compass rose rotatably associated with said base, and scales on said base peripherally adjacent and for indicative registration with the calibrations of said compass rose, a grid disc concentric with and rotatable independently of said compass rose, a pair of arms independently swingable about the compass rose and grid disc pivotal axis, linear scales arranged on said arms in registration of their initial points with the arm pivotal axis, and means for indicatively registering the arm center lines with the base, scales and compass rose calibrations.

10. In a device of the character described having a base, a compass rose rotatably associated with said base and scales on said base peripherally adjacent and for indicative registration with the calibrations of said compass rose, a grid disc concentric with and rotatable independently of said compass rose, a pair of arms independently swingable parallel to said base about the compass rose pivotal axis, means for indicatively registering the arm center lines with said scales and compass rose calibrations, a third arm pivotally and slidably associated with one of the arms of said pair in parallel relation with said base, a second compass rose movable with and rotatable independently about the third arm pivotal axis, means for indicatively registering the third arm center line with the second compass rose calibrations, and linear scales correspondingly arranged on said arms in registration of their initial points with the respective arm pivotal axis.

11. In a navigational computer, the combination with a base having concentric, independently rotatable, compass rose and grid disc elements, of a pair of arms independently swingable parallel to said base about the compass rose and grid disc axis, a third arm independently swingable parallel to said base about an axis movable along one of the arms of said pair, and a second compass rose carried by and rotatable independently about the third arm pivotal axis.

THOMAS P. VAN SCIEVER.

REFERENCES CITED

The following references are of record in the file of this patent:

UNITED STATES PATENTS

| Number | Name | Date |
| --- | --- | --- |
| 946,043 | Hill | Jan. 11, 1910 |
| 1,828,807 | Kennedy | Oct. 27, 1931 |
| 1,428,449 | Prall | Sept. 5, 1922 |
| 1,917,278 | Weems | July 11, 1933 |
| 2,007,986 | Sprague | July 16, 1935 |
| 2,342,674 | Kotcher | Feb. 29, 1944 |